United States Patent [19]

Tabb

[11] Patent Number: 5,548,028
[45] Date of Patent: Aug. 20, 1996

[54] CURABLE ELASTOMERIC BLEND WITH VULCANIZED FLUOROELASTOMER

[75] Inventor: David L. Tabb, Wilmington, Del.

[73] Assignee: E. I. Du Pont de Nemours and Company, Wilmington, Del.

[21] Appl. No.: 393,774

[22] Filed: Feb. 24, 1995

[51] Int. Cl.[6] ............... C08L 27/12; C08L 27/22; C08L 17/00; C08L 19/00
[52] U.S. Cl. ............... 525/194; 525/192; 525/193; 525/197; 525/199; 525/200; 525/104; 521/46
[58] Field of Search .................. 525/199, 194, 525/200, 192

[56] References Cited

U.S. PATENT DOCUMENTS

| | | |
|---|---|---|
| 2,378,717 | 6/1945 | Macey . |
| 3,291,761 | 12/1966 | Griffin . |
| 3,519,703 | 7/1970 | Merkl et al. . |
| 3,864,433 | 2/1975 | Tatsukami et al. . |
| 3,972,842 | 8/1976 | Markham . |
| 4,028,431 | 6/1977 | Futami et al. . |
| 4,251,399 | 2/1981 | Tomoda et al. .......... 260/4 R |
| 4,275,180 | 6/1981 | Clarke .................. 525/173 |
| 4,614,779 | 9/1986 | Watanabe et al. . |
| 5,008,340 | 4/1991 | Guerra et al. ........... 525/193 |
| 5,053,450 | 10/1991 | Coran .................. 524/506 |
| 5,206,293 | 4/1993 | Sakai et al. ............ 525/194 |
| 5,412,034 | 5/1995 | Tabb . |

FOREIGN PATENT DOCUMENTS

| | | |
|---|---|---|
| 230669 | 8/1987 | European Pat. Off. . |
| 3841699 | 6/1989 | Germany . |
| 57-135844 | 8/1982 | Japan . |

*Primary Examiner*—Carman J. Seccuro, Jr.

[57] ABSTRACT

Blends of previously-vulcanized fluoroelastomer with fluorine-free elastomer can be cured to have unexpectedly excellent physical properties.

20 Claims, No Drawings

CURABLE ELASTOMERIC BLEND WITH VULCANIZED FLUOROELASTOMER

BACKGROUND OF THE INVENTION

This invention relates to curable blends of previously-vulcanized fluoroelastomers with fluorine-free elastomers.

Fluoroelastomers are relatively expensive specialty polymers which exhibit excellent heat stability and fluid resistance. Conventional techniques used to transform uncured compounded elastomers, including fluoroelastomers, into cured fabricated parts such as o-rings, seal elements, and gaskets generate significant quantities of vulcanized elastomer waste, e.g. as flash, transfer pads, and runners from molding operations. Such material is not scrap in the sense of defective parts, but it does represent waste and its formation results in an economic penalty inevitably associated with manufacture of elastomer parts. With respect to fluoroelastomers, the economic penalty is magnified because of the high cost of such polymers. An inexpensive method for re-use or recycle of vulcanized fluoroelastomer waste would consequently permit a more effective utilization of material and energy in the production of fluoroelastomer manufactured goods. However, attempts to develop such processes have met with only limited success. For example, an obvious recycle process would involve blending a portion of the vulcanized fluoroelastomer with uncured fluoroelastomer and using the blend composition to produce molded goods. Use of significant proportions of vulcanized fluoroelastomer waste as an additive, however, results in sacrifice of processability and physical properties.

The high cost of fluoroelastomers makes the use of these materials prohibitive in many applications. Consequently, attempts to provide less expensive compositions having performance characteristics which approach those of fluoroelastomers have been made. For example, blends of fluoroelastomers with hydrocarbon elastomers are known, but the properties of such compositions are generally not acceptable because the two classes of elastomers are essentially incompatible. In addition, processes have been disclosed wherein mixtures of fluoroelastomer and hydrocarbon polymer components are dynamically cured. For example, Sakai et al, in U.S. Pat. No. 5,206,293, disclose rubber compositions obtained by subjecting mixtures of fluoroelastomer, polyethylene or an ethylene copolymer, and organic peroxide to shearing deformation at elevated temperature. This procedure provides a composition wherein the ethylenic resin is crosslinked, but the fluoroelastomer is uncrosslinked. Tabb, in copending U.S. patent application Ser. No. 08/143,262, now U.S. Pat. No. 5,412,034 discloses co-curable blends of fluoroelastomer and elastomeric ethylene copolymer, in which both blend components are simultaneously cured by the same curing agent.

It would not be expected that blends of vulcanized fluoroelastomer with hydrocarbon elastomers would provide useful compositions because of the above-described incompatibility of these polymers and the deleterious effect on physical properties which results when previously vulcanized fluoroelastomer is blended with uncured, virgin fluoroelastomer. However, it has now been found that vulcanized fluoroelastomer can be blended with non-fluorinated elastomers to produce elastomers having excellent physical properties.

SUMMARY OF THE INVENTION

The present invention provides a curable elastomeric blend composition comprising previously-vulcanized fluoroelastomer and fluorine-free elastomer. Such compositions, when cured, exhibit significantly enhanced heat and fluid resistance compared to conventional fluorine-free elastomers.

Preferred fluorine-free elastomers include elastomeric ethylene copolymers. Optionally, the composition can further comprise curable fluoroelastomer.

DETAILED DESCRIPTION OF THE INVENTION

The compositions of the present invention are curable blend compositions comprising mixtures of previously-vulcanized fluoroelastomer and curable, i.e. crosslinkable, fluorine-free elastomer. When cured, such compositions exhibit excellent physical properties, especially stress-strain and compression set properties. Optionally, the blend compositions can additionally contain curable fluoroelastomer. Such compositions, when cured, offer performance intermediate between that of fluoroelastomers and fluorine-free elastomers at costs comparable to that of fluorine-free elastomers alone. A further advantage of these compositions is that their manufacture provides a means for recycle of previously-vulcanized fluoroelastomer, heretofore regarded as non-recoverable waste.

When compounded fluoroelastomer compositions, i.e. fluoroelastomer compositions containing curative, additives, and fillers, are converted into fabricated parts such as o-rings, seal elements, gaskets, and the like, appreciable quantities of vulcanized fluoroelastomer flash are generated. It has now been found when such vulcanized materials are mixed with curable fluorine-free elastomers, compositions are formed which may be cured to yield useful compositions, despite the inherent incompatibility of unvulcanized fluoroelastomers with unvulcanized fluorine-free elastomers.

A wide range of previously-vulcanized fluoroelastomers can be utilized as components of the compositions of the present invention. In particular, both hydrogen-containing fluoroelastomers and perfluoroelastomers may be employed. As used herein, "previously-vulcanized fluoroelastomer" is meant to indicate at least one curable compounded elastomeric fluoropolymer (fluoroelastomer) that has been subjected to a curing operation prior to blending with the fluorine-free elastomer component of the blends of the present invention. Such previously-vulcanized compositions may be prepared, for example, by press curing, that is, by vulcanization under heat and pressure in molds. Optionally, press curing can be followed by post curing, i.e. heat treatment after demolding as is known in the art.

Fluoroelastomers useful as components of the composition of the present invention are copolymers of at least one fluorinated monomer. Commercially available examples of such polymers commonly, but not universally, contain copolymerized units of vinylidene fluoride ($VF_2$). The most widely available fluoroelastomers are copolymers of $VF_2$ with hexafluoropropylene (HFP), and, optionally, tetrafluoroethylene (TFE). Compositions which contain other fluoromonomers as well as additional non-fluorinated monomers are also well known and commercially available. For example, other common comonomers include chlorotrifluoroethylene (CTFE), hydrocarbon olefins such as ethylene (E) or propylene (P), and perfluorovinyl ethers (PVE) having the formula $CF_2=CFO(R_fO)_nR_f$ wherein n is 0–5, $R_f$ is a perfluoroalkyl group of 1–6 carbon atoms, and $R_f$ is a linear or branched perfluoroalkylene group of 2–6 carbon atoms. Examples of $R_f$ include —$CF_2CFX$—wherein X is F or $CF_3$. A preferred PVE is perfluoro(methyl vinyl) ether (PMVE). Fluoroelastomers incorporating such monomers include TFE/$VF_2$/PMVE, E/TFE/PMVE, and TFE/P copolymers.

The fluoroelastomers may also include cure site moieties present as a result of copolymerization of small quantities of cure site monomers in addition to the primary monomers described above. Copolymerized units of cure site monomers are generally present in the fluoroelastomer at concentrations up to about 3 mol%. A preferred class of copolymerizable cure site monomers useful in peroxide curable fluoroelastomers consists of bromine-containing compounds. Such is monomers include, for example, bromine-containing olefins such as bromotetrafluorobutene and bromotrifluoroethylene, and brominated fluorovinyl ethers such as $CF_2$=CF—O—$CF_2$—$CF_2Br$ and $CF_3$—$CH_2$—O—CF=CFBr. When copolymerized at the 3 mol% level the bromine-containing compounds provide about 0.05–2.0 wt %, preferably about 0.1–1.0 wt %, and most preferably 0.15–0.6 wt % bromine in the polymer. Alternatively or additionally, chain transfer or molecular weight regulating agents can be utilized during the preparation of the fluoroelastomers to introduce desirable fragments into the polymers for curing purposes. Such agents include iodine-containing compounds that result in the introduction of bound iodine at one or both ends of the polymer molecule. Methylene iodide, 1,4-diiodoperfluoro-n-butane, and 1,6-diiodo-3,3,4,4-tetrafluorohexane are representative of such agents. Iodine or bromine can be introduced at end positions of the polymer chain by other means, for example, as disclosed by Albano et al. in U.S. Pat. No. 5,173,553 using alkali metal halides. When iodine-containing compounds such as those mentioned above are utilized in the polymerization reaction, the concentration of iodine in the resultant fluoroelastomer is at least 0.001 wt %, desirably at least about 0.05 wt %, and preferably at least about 0.1 wt %.

Fluoroelastomers which contain copolymerized units of at least one fluorinated monomer and which are suitable for use in the compositions of the present invention are generally curable with polyols. Alternatively, these compositions may be crosslinked through use of amine curing systems. If appropriate additional cure site monomers are chosen, the fluoroelastomers may also be cured with organic peroxides. Representative peroxide-curable fluoroelastomers are described in Apotheker et al., U.S. Pat. No. 4,035,565; Albin, U.S. Pat. No. 4,564,662; Arcella et al., U.S. Pat. No. 4,745,165; Moore, U.S. Pat. No. 4,694,045; Moore, U.S. Pat. No. 4,948,852; Moore, U.S. Pat. No. 4,973,633; and Albano et al., U.S. Pat. No. 5,173,553. Generally, fluoroelastomers can be cured with amine curing agent systems or polyol curing agent systems, whether or not the fluoroelastomers contain a cure site moiety that responds to peroxide, as is well known in the art. This is particularly true for fluoroelastomers containing $VF_2$ and HFP. Curing agent systems used for the curable blend compositions of this invention may be the same or different from that used to cure the previously vulcanized component of the blend.

As described above, uncured fluoroelastomers may optionally be employed as additional polymeric components in the blend compositions of the present invention. Such optional curable fluoroelastomers may have the same chemical composition as the previously-vulcanized fluoroelastomer of the blend or they may be chemically distinct from the previously-vulcanized compositions. For example, they may contain different copolymerized monomer units, alternative cure site monomers, or different endgroups.

The curable fluorine-free elastomer component of the blends of the present invention may be selected from a wide range of fluorine-free elastomer types. By "fluorine-free elastomer" it is meant that the elastomer has no principal monomer that contains fluorine, and that the polymer is therefore substantially free of fluorine, i.e. contains less than 1 wt % fluorine. There is no other limitation on the chemical composition of the fluorine-free elastomer component. However, it is desirable for the fluorine-free elastomers to be curable by conventional means and to have viscosities within the range suitable for compounding on conventional blending equipment. Mooney viscosities in the range of about 10–120, preferably 10–50 (ASTM D-1646, 100° C., 1 minute preheat, viscosity measured at 4 minutes) are generally suitable, although elastomers having viscosities outside this range can be employed. Many such fluorine-free elastomers are commercially available, including copolymers of ethylene and polar comonomers, ethylene/propylene copolymers including EPDM, chlorinated and chlorosulfonated olefin polymers, nitrile rubbers, hydrogenated nitrile rubbers, and silicone rubbers. Preferred fluorine-free elastomers are copolymers of ethylene with polar monomers.

The most preferred elastomeric copolymers of ethylene and polar comonomers suitable for use in the blends of the present invention are peroxide-curable copolymers of ethylene and at least one other monomer. Such monomers include (a) $C_1$–$C_8$ alkyl esters of acrylic or methacrylic acid or (b) vinyl esters of a $C_2$–$C_4$ carboxylic acid. The copolymers can additionally contain alpha,beta-unsaturated carboxylic acids of 3–12 carbon atoms selected from the group consisting of monocarboxylic acids, dicarboxylic acids, and monoesters of dicarboxylic acids. Presence of these additional monomers renders the elastomeric ethylene copolymer amine-curable. Such copolymers are well-known in the art and a large variety are available commercially.

The ethylene content of the copolymers is generally 20–55 wt % of the polymer, preferably 20–45 wt %.

The alkyl acrylate or the vinyl ester comonomers comprise about 45–80 wt % of the polymer, preferably about 55–80 wt %. Alkyl acrylates suitable for use in the polymers include $C_1$–$C_8$ alkyl esters of acrylic acid, for example, the methyl, ethyl, isobutyl, hexyl, and 2-ethylhexyl esters. Methyl, ethyl, and butyl acrylates are preferred. Methyl acrylate is most preferred. Vinyl esters of carboxylic acids suitable for use in the polymers include vinyl esters of carboxylic acids having 2–8 carbon atoms, for example, vinyl acetate, vinyl propionate, vinyl hexanoate, and vinyl 2-ethylhexanoate. Vinyl acetate is preferred.

When present, the alpha,beta-unsaturated mono-or dicarboxylic acids are present in an amount sufficient to provide about 0.1–10 wt %, preferably 0.5–5.0 wt % of carboxylate groups. Suitable alpha, beta-unsaturated mono- or dicarboxylic acids include those having 3–12 carbon atoms, for example, monocarboxylic acids such as acrylic acid, methacrylic acid, and ethacrylic acid; dicarboxylic acids such as itaconic acid, maleic acid and fumaric acid; and monoesters of dicarboxylic acids such as ethyl hydrogen maleate, ethyl hydrogen fumarate, and 2-ethylhexyl hydrogen maleate. Acrylic acid, methacrylic acid, and ethyl hydrogen maleate are preferred.

Such copolymers are generally prepared by continuous copolymerization of ethylene and the comonomers in a stirred reactor in the presence of at least one free-radical initiator at temperatures of about from 120° C. to 300° C. and at pressures of about from 130 to 310 MPa. The most effective initiators have half lives of 0.1-1.0 sec at the reactor temperature, for example, lauryl peroxide, di-t-butyl peroxide, t-butyl peracetate, di(sec-butyl)peroxy dicarbonate, t-butyl peroxy neodecanoate, and t-amyl peroxy pivalate. Optionally, the copolymers are prepared in the presence of about 2–25 wt % methanol or acetone so that reactor fouling is decreased or eliminated, as disclosed by Hatch et al in U.S. Pat. No. 5,028,674 and by Statz in U.S. Pat. No. 5,027,593. Following discharge of polymer from the reactor, viscosity can be increased by subjecting the polymer to post-reactor processing as disclosed, for example, by Fisher et al. in U.S. Pat. No. 5,194,516 and by Harrell in U.S. Pat. No. 5,214,108.

Representative examples of specific hydrocarbon copolymers which can be used in the present invention include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, ethylene/butyl acrylate/carbon monoxide, ethylene/butyl acrylate/glycidyl methacrylate, ethylene/butyl acrylate/acrylic acid, ethylene/vinyl acetate/glycidyl methacrylate, ethylene/vinyl acetate/methacrylic acid, ethylene/vinyl propionate/glycidyl methacrylate, and ethylene/vinyl acetate/acrylic acid. Preferably the copolymers contain copolymerized units of $C_1$–$C_8$ alkyl acrylates or methacrylates. The preceding list illustrates copolymers that are peroxide-curable but not amine-curable, or not readily amine-curable.

Further representative examples of specific hydrocarbon copolymers which can be used in the present invention include ethylene/methyl acrylate/carbon monoxide, ethylene/butyl acrylate/carbon monoxide, ethylene/vinyl acetate/carbon monoxide, ethylene/vinyl butryate/carbon monoxide, ethylene/methyl acrylate/ethyl hydrogen maleate, ethylene/methyl acrylate/methacrylic acid, ethylene/acrylic acid/vinyl acetate, ethylene/butyl acrylate/acrylic acid, ethylene/vinyl acetate/methacrylic acid, ethylene/fumaric acid/methyl acrylate, ethylene/ethyl hydrogen maleate/vinyl acetate, ethylene/ethyl hydrogen maleate/carbon monoxide/methyl acrylate, ethylene/methacrylic acid/carbon monoxide/vinyl acetate, and ethylene/ethyl hydrogen maleate/carbon monoxide/vinyl acetate. This listing illustrates copolymers that are amine-curable as well as peroxide-curable.

Other fluorine-free elastomers that can be used include EPDM, chlorinated and chlorosulfonated olefin polymers, nitrile rubbers, hydrogenated nitrile rubbers, and silicone rubbers. The EPDM rubbers useful in the practice of the invention may be either ethylene propylene copolymer rubbers or ethylene/propylene/nonconjugated diene copolymers. The nonconjugated dienes generally contain from 6–22 carbon atoms, have at least one readily polymerizable double bond, and generally contain about 60–80 weight percent ethylene. The amount of nonconjugated diene is generally from about 1–7 weight percent, usually 2–5 weight percent. Preferably the ethylene/propylene copolymer rubbers are EPDM copolymers. Examples of EPDM copolymers that are especially preferred are ethylene/propylene/1,4-hexadiene, ethylene propylene/dicyclopentadiene, ethylene/propylene/norbornene, ethylene/propylene/methylene-2-norbornene, and ethylene/propylene/1,4hexadiene/norbornadiene copolymers.

Chlorinated and chlorosulfonated olefin polymers are also useful as the fluorine-free polymer component. Examples of such polymers include chlorosulfonated and chlorinated homopolymers and copolymers of $C_2$–$C_8$ alpha-monoolefins, including graft copolymers. Particularly useful examples include homopolymers of $C_2$–$C_3$ alpha monoolefins, copolymers of ethylene and carbon monoxide, and copolymers of ethylene and at least one ethylenically unsaturated monomer selected from the group consisting of $C_3$–$C_{10}$ alpha monoolefins, $C_1$–$C_{12}$ alkyl esters of unsaturated $C_3$–$C_{20}$ mono-or dicarboxylic acids, anhydrides of unsaturated $C_4$–$C_8$ dicarboxylic acids, and vinyl esters of saturated $C_2$–$C_{18}$ carboxylic acids. Specific examples of these polymers include polyethylene, polypropylene, ethylene vinyl acetate copolymers, ethylene acrylic acid copolymers, ethylene methacrylic acid copolymers, ethylene methyl acrylate copolymers, ethylene methyl methacrylate copolymers, ethylene n-butyl methacrylate copolymers, ethylene glycidyl methacrylate copolymers, graft copolymers of ethylene and maleic anhydride, graft copolymers of propylene and maleic anhydride, and copolymers of ethylene and propylene, butene, 3-methyl-1-pentene, or octene.

Nitrile rubbers may also be used as the fluorine-free elastomer component. Nitrile rubbers are copolymers of a diene and an unsaturated nitrile. The majority of nitrile rubbers which are readily available are made by copolymerizing butadiene and acrylonitrile. Examples of other conjugated dienes that may be used in place of butadiene include 2-methyl-1,3-butadiene, 2-chloro-1,3-butadiene, and 1,3-pentadiene. Other specific examples of the alpha,beta-unsaturated nitrile monomers include methacrylonitrile and alpha-chloroacrylonitrile. Diene nitrile copolymers containing additional comonomers such as acrylic, methacrylic, or itaconic acids may also be used in the practice of the invention. In addition, hydrogenated nitrile rubbers may be used.

Additional polymers which may be selected as the curable fluorine-free elastomer include other thermoset elastomers such as silicone rubber and polyacrylates.

The curable blend compositions of this invention can be crosslinked by use of a curing agent system that is effective for crosslinking the fluorine-free elastomer component of the blend. Thus, for example, peroxide can be used with most fluorine-free elastomers. Additionally, amine curing agents can be used with the preferred ethylene copolymer elastomers as discussed above, and sulfur curing agents can be used with several fluorine-free elastomers, such as chlorosulfonated olefin polymers, EPDM and nitrile rubbers.

When optional curable fluoroelastomer is present in the curable blend composition, a curing agent system that is effective for both the curable fluoroelastomer component and the fluorine-free elastomer component is used. The curing agent system can be a peroxide system if the curable fluoroelastomer contains a cure site moiety that responds to peroxide. Likewise, the curing agent system can be an amine system if the fluorine-free elastomer responds to amine, e.g., is an ethylene copolymer containing units of an alpha, beta-unsaturated carboxylic acid, and if the curable fluoroelastomer is amine-curable, i.e., contains $VF_2$ and HFP as discussed above. If the curable fluoroelastomer and the fluorine-free elastomer are each peroxide-curable and amine-curable, then a mixed peroxide and amine curing agent system can be used.

Peroxides useful as curing agents in the practice of the present invention are organic peroxides that decompose rapidly within the temperature range 150°–250° C. Representative examples include dicumyl peroxide, t-butyl perbenzoate, benzoyl peroxide, t-butyl peracetate, 1,1-di(t-butylperoxy)3,3,5-trimethylcyclohexane, 2,5-dimethyl-2,5,di-(t-butylperoxy)hexane, 2,5-dimethyl-2,5, n-butyl-4,4-bis(t-butylperoxy valerate), and di[1,3-dimethyl-3-(t-butylperoxy) butyl]carbonate. Use of a combination of more than one peroxide is advantageous in certain circumstances, although generally one peroxide is used alone. Typically, about 0.5–5 phr (parts per hundred parts of polymer resin, by weight) of peroxide are used. The peroxide may be adsorbed on an inert carrier, the weight of which is not included in the range stated for the peroxide.

A coagent, that is, a polyunsaturated compound which is capable of cooperating with the peroxide to provide a useful cure, is usually present as part of a peroxide curing agent system. Such compounds include triallyl cyanurate, triallyl isocyanurate, trimethallyl isocyanurate, diallyl maleate, high vinyl low molecular weight butadiene, N,N'-m-phenylene dimaleimide, pentaerythritol triacrylate, pentaerythritol trimethacrylate, trimethylolpropane triacrylate, and trimethylolpropane trimethacrylate. Use of such coagents in curing or crosslinking processes is well-established in the art. More than one coagent may be used, but generally one coagent is used alone. The amount of coagent can be about 0.1–10 phr, about 0.5–5 phr being preferred.

Amine curing agents that are useful in the practice of this invention are generally diamines, but the use of amines having higher amino functionality is also possible. Representative examples of such compounds include hexamethylenediamine, hexamethylenediamine carbamate, tetramethylenepentamine, hexamethylenediaminecinnamaldehyde adduct, and hexamethylenediaminedibenzoate salt. Aromatic amines can also be used as curing agents. More than one amine curing agent may be used, but generally one amine is used alone. The concentration of amine curing agent is usually about 0.1–5 phr.

Cure accelerators can be used in conjunction with amine curing agents, as is well-known in the art. Suitable accelerators include quaternary ammonium compounds, quaternary phosphonium compounds, penta-substituted guanidines and salts thereof, trisubstituted amidines, cyclic polyethers, and open-chain polyethers. Accelerator concentration is usually about 0.1–10 phr. A discussion of amine curing agent systems is presented in U.S. Pat. No. 3,859,259.

The curable blend compositions of this invention can also contain typical compounding ingredients and additives used in elastomers, such as fillers, plasticizers, processing aids, antioxidants, and the like. The amounts of such ingredients will depend on the particular uses for which the cured compositions are adapted.

The amount of previously-vulcanized fluoroelastomer used in the curable elastomeric blend compositions of this invention can vary over a wide range, depending on the result desired. Concentration of previously-vulcanized fluoroelastomer can be low, e.g., 10 parts by weight per 100 parts by weight fluorine-free elastomer, or it can be high, e.g., 1000 parts by weight per 100 parts by weight of fluorine-free elastomer. Generally, 20–800 parts by weight per 100 parts by weight of fluorine-free elastomer are used, preferably 30–600 parts.

The previously-vulcanized fluoroelastomer can be prepared for blending with the fluorine-free elastomer to form the curable elastomeric blends of this invention by any means that shreds or finely subdivides the previously-vulcanized fluoroelastomer. Such means include, for example, milling on a refining mill to shred the vulcanizate into a tissue-like texture, grinding, or cryogenic grinding.

The curable blend compositions of this invention are generally compounded with curatives and additives at temperatures below the curing temperature of the elastomer. Compounding is typically carried out in an internal mixer or on a rubber mill. Blending can be accomplished in a single step, with all ingredients mixed at once. Alternatively, blending can take place in two or more steps in various combinations. Such steps can be sequential using a single piece of equipment, or they can be performed in different pieces of equipment at different times. For example, the previously-vulcanized fluoroelastomer and curable fluorine-free elastomer can be blended in a first step, and the resultant blend can later be compounded with additives and curatives.

The curable blends of the present invention may be used to produce o-rings, gaskets, hoses, and sheet products. It has been found that blends of previously-vulcanized fluoroelastomer and ethylene copolymers having polar comonomers are particularly useful because they exhibit excellent stress-strain properties, compression set resistance, and low volume swell. Such compositions are particularly useful for manufacture of parts for automotive applications.

The invention is further illustrated by reference to the following examples wherein all parts are by weight unless otherwise indicated.

EXAMPLES

Compositions used in each of the examples and controls were prepared by the following general procedure. First, previously vulcanized fluoroelastomer, prepared as described below, and fluorine-free copolymer elastomer were placed in an internal mixer (B Banbury), along with other compounding ingredients, at a loading factor of 70%. The polymers and other ingredients were mixed until a temperature of approximately 77° C. was reached. The compound was then discharged and sheeted out on a two-roll rubber mill.

Vulcanizate properties were measured on test specimens obtained from slabs (76 mm×152 mm×1.9 mm) and on o-rings (25.4 mm inside diameter×3.53 mm thick). Unless otherwise noted, the slabs and o-rings were molded from the compounded blend using a press cure of 177° C. for 10 min followed by a post cure at 177° C. for 8 hr in a circulating air oven.

Stress-strain properties were measured according to ASTM Method D-412. Compression set was measured on o-rings according to ASTM Method D-395. Volume change upon exposure to selected fluids was measured according to ASTM Method D-471.

The previously-vulcanized fluoroelastomer used in the examples below was flash obtained from an o-ring molding operation. The flash was press cured but not post cured. The fluoroelastomer was a copolymer of vinylidene fluoride ($VF_2$) and hexafluoropropylene (HFP) in the approximate weight ratio $VF_2$/HFP=60/40, having Mooney viscosity $ML_{1+10}$=50 at 121° C., and prepared generally according to U.S. Pat. No. 3,707,529, into which a bisphenol cure system was incorporated. It was compounded with approximately 30 phr carbon black, approximately 6 phr calcium hydroxide and approximately 3 phr magnesium oxide and vulcanized. This press-cured vulcanizate was then prepared for use in blends with fluorine-free elastomers by different methods as defined in Table 1.

TABLE 1

| Vulcanized Fluoroelastomer Preparations | |
|---|---|
| Identification | Fluoroelastomer Preparation |
| Fluoro-elastomer F | Vulcanized (press cured) fluoroelastomer milled on a refining mill to shred the vulcanizate into a tissue-like texture. |

TABLE 1-continued

Vulcanized Fluoroelastomer Preparations

| Identification | Fluoroelastomer Preparation |
|---|---|
| Fluoroelastomer G | Vulcanized (press cured) fluoroelastomer cryogenically ground to produce a powder that passed through a 100-mesh screen. |
| Fluoroelastomer H | Vulcanized fluoroelastomer, post cured at 232° C. for 24 hr, then cryogenically ground to produce a powder that passed through a 100-mesh screen. |

Fluorine-free elastomers used in the examples below are identified in Table 2. Approximate compositions indicated are on a weight basis. Notation employed is as follows:

E=ethylene
MA=methyl acrylate
MAME=ethyl hydrogen maleate
HC=hydrocarbon
HNBR=hydrogenated butadiene/acrylonitrile rubber

TABLE 2

Fluorine-Free Elastomers

| Identification | Composition, Viscosity, and Reference |
|---|---|
| Ethylene Copolymer A | E/MA = 29/71 weight ratio<br>$ML_{1+4}$ = 22 at 100° C.<br>U.S. Pat. No. 3,904,588 & 5,194,516 |
| Ethylene Copolymer B | E/MA/MAME = 32/63/5 weight ratio<br>$ML_{1+4}$ = 16 at 100° C.<br>U.S. Pat. No. 3,904,588 & 5,194,516 |
| Ethylene Copolymer C | E/MA/MAME = 41/54/4 weight ratio<br>$ML_{1+4}$ = 16 at 100° C.<br>U.S. Pat. No. 3,904,588 & 5,194,516 |
| HC Elastomer D | Nordel ® 1440 Hydrocarbon Rubber, DuPont Co.<br>$ML_{1+4}$ = 40 at 121° C. |
| HNBR Elastomer E | Butadiene/acrylonitrile = 64/36 weight ratio<br>Hydrogenated, saturation level = 96%<br>$ML_{1+4}$ = 85 at 100° C.<br>Zetpol ® 2010, Zeon Chemicals |

Two peroxide curing agents were used in the examples. Peroxide A was 45 wt % 2,5-dimethyl-2,5-di(t-butylperoxy)-hexane on an inert support (Luperco® 101XL, Atomchem, Inc.). Peroxide B was 40 wt % dicumyl peroxide on precipitated calcium carbonate (DiCup®40C, Hercules).

Examples 1–6 and Control A

Fluoroelastomer F was blended with Ethylene Copolymer A with other ingredients appropriate to peroxide curing of the elastomeric ethylene copolymer in the proportions shown in Table 3. The resultant composition was molded, cured, and tested following the general procedure outlined above. Test results are presented in Table 3. The cured compositions exhibited typical elastomeric properties over a broad range of blend compositions.

Examples 7–8 and Control B

Fluoroelastomer F was blended with ethylene copolymer B in the same proportions used in Examples 1–6 and with other ingredients appropriate to amine curing of the elastomeric ethylene copolymer as shown in Table 4. The resultant compositions were molded, cured, and tested according to the general procedure outlined above. Test results showed systematic variation with concentration of previously-vulcanized fluoroelastomer, so only the tests for the blends with lowest and highest concentration of previously-vulcanized fluoroelastomer are also presented in Table 4. Together with Examples 1–6, these results show that useful properties can be obtained for blends of this invention with a variety of curing systems.

TABLE 3

Formulations and Results for Examples 1–6 and Control A

| | A | 1 | 2 | 3 | 4 | 5 | 6 |
|---|---|---|---|---|---|---|---|
| Formulation (wt parts): | | | | | | | |
| Ethylene copolymer A | 100 | 100 | 100 | 100 | 100 | 100 | 100 |
| Fluoroelastomer F | — | 50 | 100 | 150 | 250 | 350 | 550 |
| SRF carbon black (N-774) | 65 | 65 | 65 | 65 | 65 | 65 | 65 |
| Substituted diphenylamine | 1.0 | 1.0 | 1.0 | 1.0 | 1.0 | 1.0 | 1.0 |
| Stearic acid | 1.5 | 1.5 | 1.5 | 1.5 | 1.5 | 1.5 | 1.5 |
| Octadecylamine | 0.5 | 0.5 | 0.5 | 0.5 | 0.5 | 0.5 | 0.5 |
| Complex organic alkyl acid phosphate | 0.5 | 0.5 | 0.5 | 0.5 | 0.5 | 0.5 | 0.5 |
| N,N'-m-phenylenedimaleimide | 2.0 | 2.0 | 2.0 | 2.0 | 2.0 | 2.0 | 2.0 |
| Peroxide B | 6.0 | 6.0 | 6.0 | 6.0 | 6.0 | 6.0 | 6.0 |
| Vulcanizate Properties: | | | | | | | |
| Stress-Strain Properties: | | | | | | | |
| 100% modulus (MPa) | 3.1 | 3.8 | 3.7 | 3.7 | 4.2 | 4.3 | 4.5 |
| Tensile strength (MPa) | 11.2 | 10.9 | 10.4 | 10.0 | 10.1 | 9.5 | 8.4 |
| Elongation at break (%) | 375 | 315 | 310 | 305 | 290 | 270 | 250 |
| Compression set (%) | | | | | | | |
| 150° C./70 hr | 37 | 35 | 38 | 38 | 37 | 37 | 39 |

TABLE 3-continued

Formulations and Results for Examples 1–6 and Control A

|  | A | 1 | 2 | 3 | 4 | 5 | 6 |
|---|---|---|---|---|---|---|---|
| Volume change (%) | | | | | | | |
| ASTM #3 oil, 150° C./70 hr | 28 | 23 | 20 | 18 | 14 | 12 | 10 |

TABLE 4

Formulations and Results for Examples 7–8 and Control B

|  | B | 7 | 8 |
|---|---|---|---|
| Formulation (wt parts): | | | |
| Ethylene Copolymer B | 100 | 100 | 100 |
| Fluoroelastomer F | — | 50 | 550 |
| SRF carbon black (N-774) | 65 | 65 | 65 |
| Substituted diphenylamine | 2.0 | 2.0 | 2.0 |
| Stearic acid | 1.5 | 1.5 | 1.5 |
| Octadecylamine | 0.5 | 0.5 | 0.5 |
| Complex organic alkyl acid phosphate | 0.5 | 0.5 | 0.5 |
| Hexamethylenediamine carbamate | 1.5 | 1.5 | 1.5 |
| Diorthotolylguanidine | 4.0 | 4.0 | 4.0 |
| Vulcanizate Properties: | | | |
| Stress-strain Properties: | | | |
| 100% modulus (MPa) | 6.6 | 6.3 | 6.8 |
| Tensile strength (MPa) | 16.7 | 15.8 | 11.9 |
| Elongation at break (%) | 245 | 255 | 180 |
| Compression set (%) | | | |
| 150° C./70 hr | 25 | 39 | 59 |
| Volume change (%) | | | |
| ASTM #3 oil, 150° C./70 hr | 36 | 31 | 12 |

Examples 9–10 and Control C

Fluoroelastomers G and H were blended with Ethylene Copolymer C in the proportions and with other ingredients appropriate to amine curing of the elastomeric ethylene copolymer as shown in Table 5. The resultant compositions were molded, cured, and tested according to the general procedure outlined above, except that post cure time was 4 hr. Test results presented in Table 5 show that previously-vulcanized fluoroelastomer samples treated by various means of subdivision and having different cure histories can be used in blends of this invention.

TABLE 5

Formulations and Results for Examples 9-10 and Control C

|  | C | 9 | 10 |
|---|---|---|---|
| Formulation (wt parts): | | | |
| Ethylene Copolymer C | 100 | 100 | 100 |
| Fluoroelastomer G | — | 30 | — |
| Fluoroelastomer H | — | — | 30 |
| SRF carbon black (N-774) | 60 | 60 | 60 |
| Substituted diphenylamine | 2.0 | 2.0 | 2.0 |
| Stearic acid | 1.5 | 1.5 | 1.5 |
| Octadecylamine | 0.5 | 0.5 | 0.5 |
| Complex organic alkyl acid phosphate | 0.5 | 0.5 | 0.5 |
| Hexamethylenediamine carbamate | 1.5 | 1.5 | 1.5 |
| Diorthotolylguanidine | 4.0 | 4.0 | 4.0 |
| Vulcanizate Properties: | | | |
| Stress-strain Properties: | | | |
| 100% modulus (MPa) | 4.0 | 4.4 | 4.9 |
| Tensile strength (MPa) | 15.0 | 13.7 | 13.0 |
| Elongation at break (%) | 325 | 310 | 285 |
| Compression set (%) | | | |
| 150° C./70 hr | 21 | 34 | 31 |
| Volume change (%) | | | |
| ASTM #3 oil, 150° C./7 days | 63 | 57 | 57 |

Examples 11–12 and Control D

These examples illustrate the utility of blends of the present invention which contain uncured fluoroelastomer in addition to previously-vulcanized fluoroelastomer and fluorine-free elastomer. Two curable fluoroelastomer gums were used as uncured fluoroelastomer components. They were both tetrapolymers of VF$_2$, HFP, TFE, and bromotetrafluorobutene (BTFB). Fluoroelastomer J had an approximate composition of VF$_2$/HFP/TFE/BTFB=50/28/20/1.7 by weight and a Mooney viscosity ML$_{1+10}$ =90 at 121° C. (see U.S. Pat. No. 4,035,565). Fluoroelastomer K had an approximate composition VF$_2$/HFP/TFE/BTFB=50/29/20/0.6, contained 0.2 wt % iodine, and had a Mooney viscosity ML$_{1+10}$=20 at 121° C. (see U.S. Pat. No. 4,948,852). Fluoroelastomer F was blended with Ethylene Copolymer A and Fluoroelastomer J or K in proportions and with other ingredients appropriate to peroxide curing of the elastomeric ethylene copolymer and the fluoroelastomer gum as shown in Table 6. The resultant compositions were molded, cured, and tested according to the general procedure outlined above, except that the post cure temperature was 175° C. Test results are also presented in Table 6. As shown, useful properties were obtained for these blends of previously-vulcanized fluoroelastomer with curable fluorine-free elastomer and curable fluoroelastomer over broad concentration ranges of previously-vulcanized fluoroelastomer and curable fluoroelastomer.

TABLE 6

Formulations and Results for Examples 11–12 and Control D

|  | D | 11 | 12 |
|---|---|---|---|
| Formulation (wt parts): | | | |
| Ethylene Copolymer A | 100 | 58 | 37 |
| Fluoroelastomer F | — | 39 | 250 |
| Fluoroelastomer J | — | 14 | — |
| Fluoroelastomer K | — | — | 105 |

TABLE 6-continued

Formulations and Results for Examples 11–12 and Control D

|  | D | 11 | 12 |
|---|---|---|---|
| SRF carbon black (N-774) | 65 | 40 | 35 |
| Substituted diphenylamine | 1.0 | 0.7 | 1.0 |
| Stearic acid | 1.5 | 1.0 | — |
| Octadecylamine | 0.5 | 0.3 | 0.5 |
| Complex organic alkyl acid phosphate | 0.5 | 0.3 | — |
| Triallylisocyanurate | 2.0 | 1.5 | 2.0 |
| N,N'-m-phenylenedimaleimide | — | 1.5 | — |
| 1,8-bis-(dimethylamino)naphthalene | — | 0.2 | — |
| Peroxide A | 5.0 | 3.5 | 5.0 |
| Vulcanizate Properties: | | | |
| Stress-strain Properties: | | | |
| 100% modulus (MPa) | 3.6 | 4.8 | 2.9 |
| Tensile strength (MPa) | 11.9 | 10.9 | 10.1 |
| Elongation at break (%) | 330 | 235 | 310 |
| Compression set (%) | | | |
| 150° C./70 hr | 21 | 30 | 49 |
| Volume change (%) | | | |
| ASTM #3 oil, 150° C./70 hr | 30 | 20 | — |
| IRM 903 oil, 150° C./70 hr | — | — | 9 |

Examples 13–14 and Control E

Fluoroelastomer F was blended with HC Elastomer D in proportions and with other ingredients appropriate to peroxide curing of the hydrocarbon elastomer as shown in Table 7. The resultant compositions were molded, cured, and tested according to the general procedure outlined above. Test results are presented in Table 7. As shown, useful properties were obtained for these blends of previously-vulcanized fluoroelastomer with curable fluorine-free elastomer over a broad range of blend compositions.

TABLE 7

Formulations and Results for Examples 13–14 and Control E

|  | E | 13 | 14 |
|---|---|---|---|
| Formulation (wt parts): | | | |
| HC Elastomer D | 100 | 100 | 100 |
| Fluoroelastomer F | — | 100 | 250 |
| SRF carbon black (N-774) | 70 | 70 | 70 |
| Zinc oxide | 3.0 | 3.0 | 3.0 |
| Triallylisocyanurate | 1.0 | 1.0 | 1.0 |
| Peroxide A | 6.0 | 6.0 | 6.0 |
| Vulcanizate Properties: | | | |
| Stress-strain Properties: | | | |
| 100% modulus (MPa) | 6.6 | 5.3 | 4.0 |
| Tensile strength (MPa) | 9.2 | 7.2 | 5.3 |
| Elongation at break (%) | 125 | 125 | 130 |
| Compression set (%) | | | |
| 150° C./70 hr | 36 | 40 | 37 |

Examples 15–17 and Control F

Fluoroelastomer F was blended with HNBR Elastomer E in proportions and with other ingredients appropriate to peroxide curing of the hydrogenated nitrile elastomer as shown in Table 8. The resultant blends were molded, cured, and tested according to the general procedure outlined above. Test results are also presented in Table 8. As shown, useful properties were obtained for these blends of previously-vulcanized fluoroelastomer with another curable fluorine-free elastomer, and for blends additionally containing another fluorine-free elastomer and curable fluoroelastomer.

TABLE 8

Formulations and Results for Examples 15–16 and Control F

|  | F | 15 | 16 | 17 |
|---|---|---|---|---|
| Formulation (wt parts): | | | | |
| HNBR Elastomer E | 100 | 100 | 50 | 35 |
| Fluoroelastomer F | — | 100 | 100 | 100 |
| Ethylene copolymer A | — | — | 50 | 35 |
| Fluoroelastomer J | — | — | — | 30 |
| SRF carbon black (N-774) | 50 | 50 | 50 | 50 |
| Calcium oxide | 3.0 | 3.0 | 3.0 | 3.0 |
| Substituted diphenylamine | 1.0 | 1.0 | 1.0 | 1.0 |
| Triallylisocyanurate | 2.0 | 2.0 | 2.0 | 2.0 |
| Peroxide A | 5.0 | 5.0 | 5.0 | 5.0 |
| Vulcanizate Properties: | | | | |
| Stress-strain Properties | | | | |
| 100% modulus (MPa) | 4.2 | 15.9 | 16.5 | 17.0 |
| Tensile strength (MPa) | 25.4 | 21.2 | 17.1 | 19.2 |
| Elongation at break (%) | 355 | 135 | 105 | 115 |
| Compression set (%) | | | | |
| 125° C./70 hr | 40 | 31 | 31 | 30 |
| 150° C./70 hr | 64 | 51 | 53 | 50 |
| Volume change (%) | | | | |
| ASTM #3 oil, 150° C./70 hr | 25 | 14 | 16 | 13 |

I claim:

1. A curable elastomeric blend composition, consisting essentially of previously-vulcanized fluoroelastomer and uncured fluorine-free elastomer prepared by a process which comprises shredding or finely subdividing the previously vulcanized fluoroelastomer and blending the thus-treated fluoroelastomer with the uncured fluorine-free elastomer.

2. The composition of claim 1, further comprising curable fluoroelastomer.

3. The composition of claim 1, wherein the concentration of said previously-vulcanized fluoroelastomer is from 10 to 1000 parts by weight per 100 parts by weight of said fluorine-free elastomer.

4. The composition of claim 3, wherein the concentration of said previously-vulcanized fluoroelastomer is from 30 to 600 parts by weight per 100 parts by weight of said fluorine-free elastomer.

5. The composition of claim 1, wherein said fluorine-free elastomer is an elastomeric copolymer of ethylene and a polar comonomer.

6. The composition of claim 1, wherein said fluorine-free elastomer is hydrogenated nitrile rubber.

7. The composition of claim 1, wherein said fluorine-free elastomer is ethylene/propylene copolymer.

8. The composition of claim 1, wherein said fluorine-free elastomer is a chlorinated or chlorosulfonated olefin polymer.

9. The composition of claim 1, wherein said fluorine-free elastomer is a nitrile rubber.

10. The composition of claim 1 which additionally contains an organic peroxide curing agent.

11. The composition of claim 1 which additionally contains an amine curing agent.

12. The composition of claim 1 wherein the previously-vulcanized fluoroelastomer comprises copolymerized units of vinylidene fluoride.

13. The composition of claim 10 wherein the fluoroelastomer comprises copolymerized units of vinylidene fluoride, hexafluoropropylene, and tetrafluoroethylene.

14. A curable elastomer composition prepared by a process which comprises
   a) shredding or finely subdividing a previously-vulcanized fluoroelastomer; and
   b) blending the thus-treated fluoroelastomer, an uncured fluorine-free elastomer, and a curing agent for the fluorine-free elastomer at a temperature below that necessary to effect cure of the fluorine-free elastomer to produce a curable elastomer composition consisting essentially of the previously-vulcanized fluoroelastomer and the uncured fluorine-free elastomer.

15. The composition of claim 14 wherein the amount of previously-vulcanized fluoroelastomer which is blended with uncured fluorine-free elastomer is from 10 to 1000 parts by weight per 100 parts by weight of fluorine-free elastomer.

16. The composition of claim 14 wherein the amount of previously-vulcanized fluoroelastomer which is blended with uncured fluorine-free elastomer is from 30 to 600 parts by weight per 100 parts by weight of fluorine-free elastomer.

17. The composition of claim 14 wherein the curing agent is an organic peroxide curing agent.

18. The composition of claim 14 wherein the curing agent is an amine curing agent.

19. The composition of claim 14 wherein the previously-vulcanized fluoroelastomer comprises copolymerized units of vinylidene fluoride.

20. The composition of claim 14 wherein the fluorine-free elastomer is a copolymer of ethylene and a polar comonomer.

* * * * *